United States Patent

Swindall, Jr. et al.

[11] Patent Number: 5,526,774
[45] Date of Patent: Jun. 18, 1996

[54] RESILIENT PET STAKE WITH SWIVEL EYELET

[76] Inventors: Russell M. Swindall, Jr.; Brenda T. Swindall, both of 215 Caroline Dr., Prattville, Ala. 36066

[21] Appl. No.: 368,652

[22] Filed: Jan. 4, 1995

[51] Int. Cl.$^6$ ................................................ A01K 3/00
[52] U.S. Cl. ................................................ 119/787
[58] Field of Search ........................... 119/704, 708, 119/780, 781, 786, 787, 788; 273/26 E, 200 R, 200 B, 58 C

[56] References Cited

U.S. PATENT DOCUMENTS

| | | | |
|---|---|---|---|
| 429,111 | 6/1890 | Bailey | 119/786 |
| 484,377 | 10/1892 | Robison | 119/781 |
| 1,699,308 | 1/1929 | Postings | 119/704 |
| 1,700,224 | 1/1929 | Hendersen | 273/200 R |
| 4,738,222 | 4/1988 | Terry et al. | 119/781 |
| 4,940,018 | 7/1990 | Edling | 119/708 |

FOREIGN PATENT DOCUMENTS 670915  9/1963  Canada ................................. 119/787

*Primary Examiner*—Todd E. Manahan
*Attorney, Agent, or Firm*—Jacobson, Price, Holman & Stern

[57] ABSTRACT

A pet stake for insertion vertically into the ground with the upper end of the stake having a leash connected thereto to enable a pet, such as a dog, to move in an unrestricted manner within the length parameters of the leash and then be subjected to a gentle but increasing resilient resistance to movement away from the stake due to the resilient characteristics of the stake. The stake includes a base with a corkscrew and handle by which the base can be screwed into the ground surface with the handle serving to stabilize the base and a flexible fiberglass resilient reinforced rod connected with the base. The upper end of the rod includes a spring and swivel eyelet to enable resisted movement of the dog or pet in any direction.

8 Claims, 1 Drawing Sheet

RESILIENT PET STAKE WITH SWIVEL EYELET

BACKGROUND OF THE INVENTION

1. Field of the Invention

The present invention generally relates to a resilient pet stake having a corkscrew base for insertion vertically into the ground with the upper end of the stake having a spring and swivel eyelet for connecting a leash thereto to enable a pet, such as a dog, to move in an unrestricted manner within the length parameters of the leash and then be subjected to a gentle but increasing resistance to outward movement in relation to the stake due to the resilient characteristics of the stake. The stake base includes a lateral handle by which the base can be screwed into the ground surface with the handle serving to stabilize the base and a flexible fiberglass reinforced rod connected to the base.

2. Description of the Prior Art

Various devices have been created to tether animal pets including stakes inserted into and extending upwardly from the ground surface with a flexible tether line interconnecting the stake and pet. The following U.S. patents disclose devices relating to this field of endeavor.

| | |
|---|---|
| 289,033 | 3,067,717 |
| 429,111 | 3,189,004 |
| 1,699,308 | 3,216,723 |
| 1,700,224 | 4,940,018 |
| 2,481,559 | D 244,870 |

The above patents disclose various structures to enable free movement of pets within the constraints of a leash and various arrangements in which resilient force is used to restrict the movement of the pet. However, the prior patents do not disclose the specific structural arrangement of the pet stake disclosed in this application including the spring and swivel eyelet at the upper end thereof, the corkscrew base including the handle which forms a stabilizer and the resilient characteristics of the fiberglass rod to provide an increasing resilient resistance to movement of the pet as the pet moves away from the stake.

SUMMARY OF THE INVENTION

An object of the present invention is to provide a pet stake including a resilient rod having a corkscrew base attached thereto which includes a laterally extending, loop type handle to enable the corkscrew to be easily rotated into hard ground surfaces or the like with the handle stabilizing the stake when it comes into contact with the ground surface to prevent wobbling of the stake.

Another object of the invention is to provide a pet stake in accordance with the preceding object in which the upper end of the rod is provided with a spring and swivel eyelet to which the leash on a dog or other pet is attached.

A further object of the invention is to provide a pet stake in which the rod is constructed of glass fiber reinforced resin having flexibility characteristics which will gradually resist flexing movement or bending movement to gradually slow down outward movement of a pet without exerting a jerk or positive stop to the movement of the pet thus enhancing the comfort and safety of the pet.

Still another object of the invention is to provide a pet stake in which the spring and eyelet at the upper end of the rod are capable of pivoting and moving into various positions to enable the pet to move in any pattern without entangling the leash with the pet stake.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
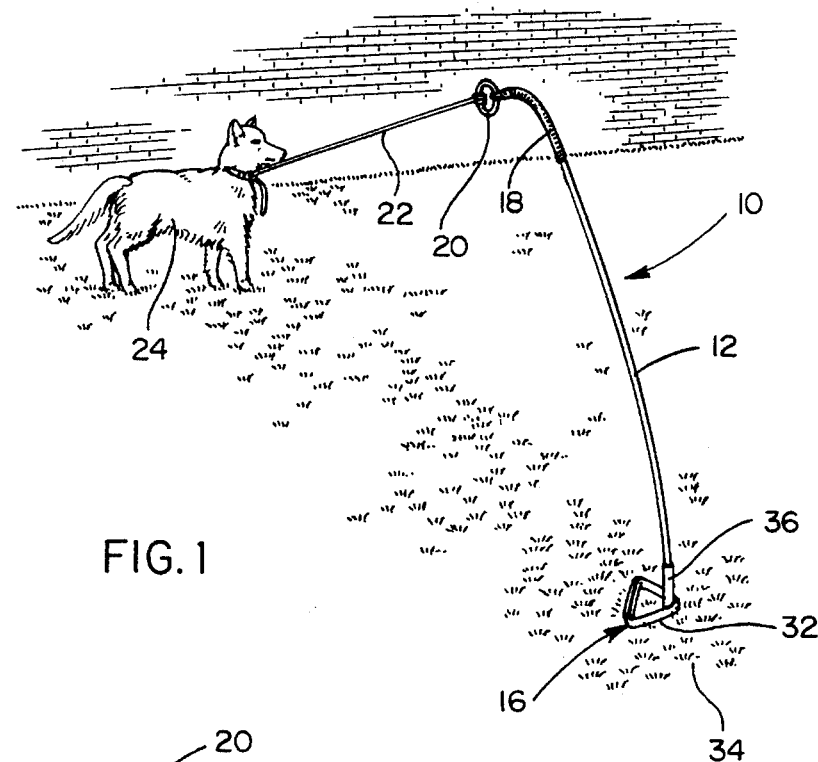
FIG. 1 is a perspective view of the pet stake of the present invention illustrating its association with a dog and the ground surface.
Figure 2:
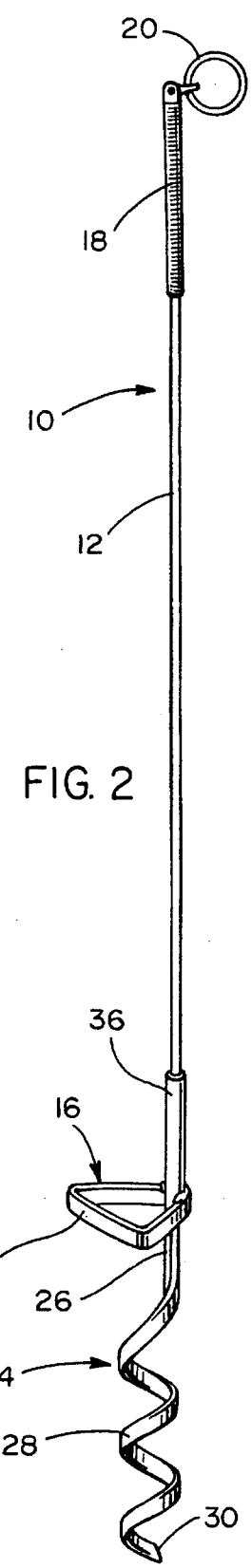
FIG. 2 is a side elevational view of the pet stake.

Referring to the drawings, the pet stake is generally designated by reference numeral 10 and includes an elongated flexible rod 12 of resilient construction having a corkscrew base 14 at the lower end with the corkscrew base including a handle 16 thereon. The upper end of the rod 12 includes a coil spring 18 connected thereto and a swivel eyelet 20 to which a flexible leash 22 is attached with the leash being connected with a dog 24 or other pet in a conventional manner.

The corkscrew base 14 includes a vertically disposed, straight shank 26 terminating in a larger diameter corkscrew 28 having a bevelled terminal lower end 30. The corkscrew 14 is of substantially rigid construction and the spiral convolutions defining the corkscrew having a diameter substantially larger than the cross sectional area of the shank 26. The base 14 and the handle 16 may be constructed of rigid metal or equivalent material with the corkscrew 28 being anchored into the ground surface by rotation about its longitudinal axis while downward force is exerted thereon.

To facilitate rotation of the base and exerting downward force thereon, the shank 26 is provided with a loop shaped handle 16 in the form of a triangular shaped member 32 having one apex anchored to the shank and the other apices spaced therefrom. The handle 16 extends laterally or radially from the shank and enables a rotational force to be exerted thereon to facilitate rotation of and anchoring of the corkscrew 28 into the ground surface 34 with the handle 16 coming into contact with the ground surface when the corkscrew has been completely screwed into the ground surface in order to stabilize the pet stake 10 and prevent the rod 12 from wobbling during use when the stake 10 is pulled toward the handle 16.

Figure 4:
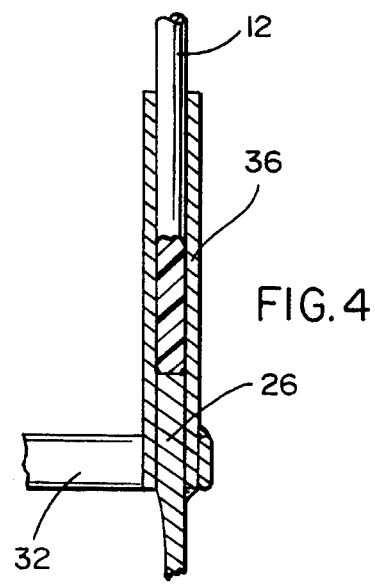
FIG. 4 is a detailed sectional view of the lower end of the stake illustrating the connection between the stake, base and handle assembly.

As illustrated in FIG. 4, the shank 26 is received in a tubular sleeve 36 and is rigidly connected thereto with the lower end of the sleeve 36 being connected with the handle 16 and receiving the lower end of the rod 12 therein in a rigid telescopic manner. The rod 12 is preferably constructed of a glass fiber reinforce resin of different sizes to provide a desired resiliency to movement of the eyelet 20 and the upper end of the rod 12. Depending upon the size and strength characteristics of the dog or other pet, the flexibility and resilient characteristics of the rod 12 may vary to provide optimum resilient resistance to movement of the dog 24 beyond the length constraints of the leash 22.

Figure 3:
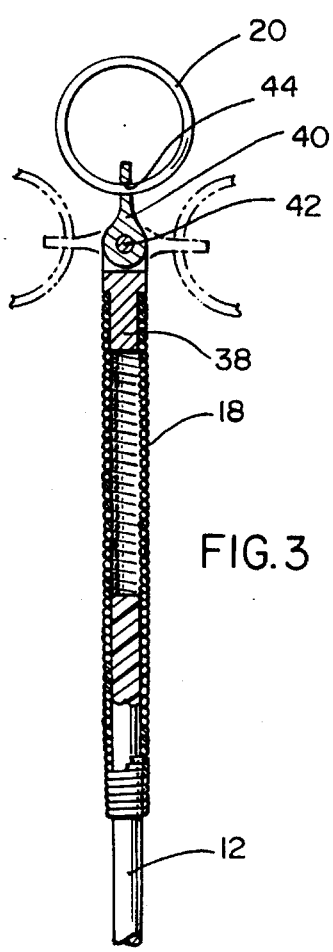
FIG. 3 is a detailed sectional view of the upper end of the stake illustrating the spring and eyelet.
Figure 5:
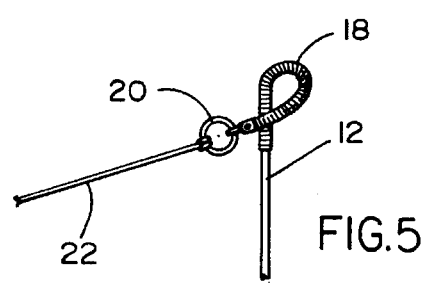
FIG. 5 is a fragmental side elevational view of the upper end of the stake, spring and swivel eyelet illustrating the movement capabilities of these components.

The spring 18 is of tubular coil construction and telescopes over the upper end of the rod 12 and is permanently secured thereto with the length of the spring being variable to enable it to flex or pivot in any direction and actually curve around into a loop as illustrated in FIG. 5 without entangling the leash with the spring. The upper end of the spring includes a shank insert 38 including a pivotal member 40 connected thereto by a pivot pin 42 with the member 40 including an eye 44 receiving the eyelet 20 as illustrated in FIG. 3 which enables the eyelet 20 to swivel or pivot about the axis of the pin 42 and also the shank 38 can swivel with the upper end of the spring about the longitudinal axis of the spring and rod. This structure eliminates entanglement of the leash with the stake and enables the pet animal to move in any desired direction in relation to the stake.

As the pet moves away from the stake, free movement is permitted until the distance of the pet from the stake is greater than the length of the leash at which time the stake or rod will bend to slow down the forward motion of the pet in a gradual manner with increasing resilient resistance and will not cause a sharp jerk to be imparted to the pet as would occur if the rod 12 was not flexible and resilient. The spring and swivel at the upper end of the rod including the eyelet enables 360° movement of the eyelet and the pet. The corkscrew base, once screwed into the ground surface is substantially impossible to pull out and the handle facilitates insertion of the corkscrew into the ground surface and serves as a stabilizer to prevent wobbling of the stake when under strain by a pet pulling or tugging on the stake. This construction provides a pet stake which maintains a high degree of comfort and safety, does not impart sudden jerks to the pet and is strong, durable and weatherproof.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is as follows:

1. A pet stake comprising an elongated, flexible resilient rod, a corkscrew rigid with and forming an axial extension of one end of the rod, a coil spring mounted on and extending axially from an opposite end of the rod, a swivel eyelet mounted on said spring for connecting engagement with a pet leash with the resiliency of the rod slowing down movement of a pet once the pet moves away from the rod a distance greater than the length of the leash with the eyelet and spring enabling the lease to be oriented in various angular positions without entanglement with the rod and spring.

2. The pet stake as defined in claim 1 wherein said corkscrew includes a laterally extending handle to enable rotational force to be exerted on the corkscrew to insert the corkscrew into a support surface until the handle engages the support surface, said handle engaging the support surface preventing the elongated rod from wobbling thereby stabilizing the rod.

3. The pet stake as defined in claim 2 wherein said corkscrew includes a plurality of convolutions of constant diameter terminating in an inclined end on a terminal convolution to penetrate into the support surface when the corkscrew is rotated and force exerted thereon toward the support surface by the application of rotational force and axial force on the handle.

4. The pet stake as defined in claim 3 wherein said elongated rod is constructed of glass fiber reinforced resin having a resistance to bending corresponding to the size and strength of the pet.

5. The pet stake as defined in claim 3 wherein said corkscrew terminates at the end opposite the inclined end in a tubular sleeve, said one end of said rod being telescopically inserted and rigidly attached to said sleeve.

6. The pet stake as defined in claim 1 wherein said rod is constructed of nonmetallic resilient material.

7. The pet stake as defined in claim 1 wherein said rod is generally vertically disposed when said corkscrew is screwed into a ground surface to support said rod.

8. The pet stake as defined in claim 7 wherein said corkscrew includes a sleeve rigidly connected to a lower end of said rod, and a laterally extending handle rigid with said sleeve to enable rotational and axially downward force to be applied to said corkscrew to mount the stake in upright position on the ground surface.

* * * * *